(12) United States Patent
Öz et al.

(10) Patent No.: US 9,081,550 B2
(45) Date of Patent: Jul. 14, 2015

(54) ADDING SPEECH CAPABILITIES TO EXISTING COMPUTER APPLICATIONS WITH COMPLEX GRAPHICAL USER INTERFACES

(75) Inventors: Mert Öz, Vienna (AT); Herwig Häle, Traiskirchen (AT); Attila Muszta, Budapest (HU); Andreas Neubacher, Vienna (AT); Peter Kozma, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 1113 days.

(21) Appl. No.: 13/094,313

(22) Filed: Apr. 26, 2011

(65) Prior Publication Data
US 2012/0215543 A1 Aug. 23, 2012

Related U.S. Application Data

(60) Provisional application No. 61/444,340, filed on Feb. 18, 2011.

(51) Int. Cl.
  *G10L 11/00* (2006.01)
  *G06F 3/16* (2006.01)
  *G06F 9/44* (2006.01)

(52) U.S. Cl.
  CPC *G06F 3/167* (2013.01); *G06F 8/38* (2013.01); *G06F 9/4443* (2013.01)

(58) Field of Classification Search
  CPC ....... G10L 15/265; G10L 15/22; G10L 15/30; G06F 3/16; H04M 2201/40
  USPC ......................................................... 704/275
  See application file for complete search history.

(56) References Cited

U.S. PATENT DOCUMENTS

| 5,377,303 | A | * | 12/1994 | Firman | 704/275 |
|---|---|---|---|---|---|
| 5,748,186 | A | * | 5/1998 | Raman | 715/236 |
| 6,012,030 | A | * | 1/2000 | French-St. George et al. | 704/275 |
| 6,832,196 | B2 | * | 12/2004 | Reich | 704/270.1 |
| 6,882,974 | B2 | * | 4/2005 | James et al. | 704/270.1 |

(Continued)

OTHER PUBLICATIONS

"Attributes (C# and Visual Basics)." *msdn—Microsoft*. 5 pages. Aug. 16, 2010. Online. http://web.archive.org/web/20100128083158/http://msdn.microsoft.com/en-us/library/z0w1kczw.aspx.

(Continued)

*Primary Examiner* — Pierre-Louis Desir
*Assistant Examiner* — Fariba Sirjani
(74) *Attorney, Agent, or Firm* — Wolf, Greenfield & Sacks, P.C.

(57) ABSTRACT

At design time of a graphical user interface (GUI), a software component (VUIcontroller) is added to the GUI. At run time of the GUI, the VUIcontroller analyzes the GUI from within a process that executes the GUI. From this analysis, the VUIcontroller automatically generates a voice command set, such as a speech-recognition grammar, that corresponds to controls of the GUI. The generated voice command set is made available to a speech recognition engine, thereby speech-enabling the GUI. Optionally, a GUI designer may add properties to ones of the GUI controls at GUI design time, without necessarily writing a voice command set. These properties, if specified, are then used at GUI run time to control or influence the analysis of the GUI and the automatic generation of the voice command set.

30 Claims, 8 Drawing Sheets

(56) References Cited

U.S. PATENT DOCUMENTS

| | | | |
|---|---|---|---|
| 7,020,841 B2* | 3/2006 | Dantzig et al. | 715/727 |
| 7,036,080 B1* | 4/2006 | James et al. | 715/728 |
| 7,146,323 B2* | 12/2006 | Guenther et al. | 704/275 |
| 7,283,973 B1* | 10/2007 | Loghmani et al. | 705/26.41 |
| 7,287,248 B1* | 10/2007 | Adeeb | 717/136 |
| 7,302,392 B1* | 11/2007 | Thenthiruperai et al. | 704/251 |
| 7,328,158 B1* | 2/2008 | Burridge et al. | 704/270 |
| 7,331,036 B1* | 2/2008 | Hambleton et al. | 717/105 |
| 7,356,472 B2* | 4/2008 | Cross et al. | 704/270.1 |
| 7,389,235 B2* | 6/2008 | Dvorak | 704/275 |
| 7,487,453 B2* | 2/2009 | Goebel et al. | 715/746 |
| 7,519,946 B2* | 4/2009 | Celi et al. | 717/109 |
| 7,546,382 B2* | 6/2009 | Healey et al. | 709/246 |
| 7,647,227 B1* | 1/2010 | Khosla | 704/270.1 |
| 7,650,284 B2* | 1/2010 | Cross et al. | 704/275 |
| 7,742,923 B2* | 6/2010 | Bickel et al. | 704/275 |
| 8,160,883 B2* | 4/2012 | Lecoeuche | 704/270.1 |
| 8,165,886 B1* | 4/2012 | Gagnon et al. | 704/275 |
| 8,229,753 B2* | 7/2012 | Galanes et al. | 704/270.1 |
| 8,255,218 B1* | 8/2012 | Cohen et al. | 704/248 |
| 8,352,908 B2* | 1/2013 | Jhoney et al. | 717/106 |
| 8,464,213 B1* | 6/2013 | Stienstra et al. | 717/107 |
| 8,713,533 B2* | 4/2014 | Scholz et al. | 717/125 |
| 8,768,711 B2* | 7/2014 | Ativanichayaphong et al. | 704/275 |
| 2001/0043234 A1* | 11/2001 | Kotamarti | 345/746 |
| 2001/0047265 A1* | 11/2001 | Sepe, Jr. | 704/275 |
| 2003/0078784 A1* | 4/2003 | Jordan et al. | 704/275 |
| 2003/0105637 A1* | 6/2003 | Rodriguez et al. | 704/270 |
| 2003/0125956 A1* | 7/2003 | Lewis et al. | 704/275 |
| 2003/0200080 A1* | 10/2003 | Galanes et al. | 704/200 |
| 2004/0230637 A1* | 11/2004 | Lecoueche et al. | 709/200 |
| 2004/0260438 A1* | 12/2004 | Chernetsky et al. | 701/36 |
| 2005/0075884 A1* | 4/2005 | Badt, Jr. | 704/275 |
| 2005/0091057 A1* | 4/2005 | Phillips et al. | 704/270.1 |
| 2005/0149331 A1* | 7/2005 | Ehrlich | 704/270.1 |
| 2006/0167697 A1* | 7/2006 | Seifert et al. | 704/275 |
| 2006/0235699 A1* | 10/2006 | Dhanakshirur et al. | 704/275 |
| 2007/0150902 A1* | 6/2007 | Meyer et al. | 719/313 |
| 2007/0233495 A1* | 10/2007 | Agapi et al. | 704/270 |
| 2008/0208584 A1* | 8/2008 | Ativanichayaphong et al. | 704/260 |
| 2008/0208590 A1* | 8/2008 | Cross et al. | 704/275 |
| 2008/0228495 A1* | 9/2008 | Cross et al. | 704/275 |
| 2009/0006099 A1* | 1/2009 | Sharpe et al. | 704/275 |
| 2009/0119586 A1* | 5/2009 | Weng et al. | 715/705 |
| 2009/0172546 A1* | 7/2009 | Chang et al. | 715/728 |
| 2009/0182562 A1* | 7/2009 | Caire et al. | 704/275 |
| 2010/0207875 A1* | 8/2010 | Yeh | 345/156 |
| 2011/0022393 A1* | 1/2011 | Waller et al. | 704/270 |
| 2011/0301943 A1* | 12/2011 | Patch | 704/9 |
| 2011/0301958 A1* | 12/2011 | Brush et al. | 704/275 |

OTHER PUBLICATIONS

Chartier, "15 Seconds: Introduction to the .NET Speech SDK." Internet.com. 13 pages. Nov. 26, 2002. Online. http://www.15seconds.com/issue/021126.htm.

"Classic VB/API—What is a Window Handle (hWnd) and What is it used for?" VBWire—Forums. 2 pages. Feb. 17, 2006. Online. http://www.vbforums.com/showthread.php?t=357187.

"Custom Controls in Visual C# .NET." Akadia.com. 15 pages. May 5, 2009. Online. http://web.archive.org/web/20090505213917/http://www.akadia.com/services/dotnet_user_controls.html.

"Developing Custom Windows Forms Controls with the .NET Framework." MSDN—Microsoft. 2 pages. Jan. 28, 2010. Online. http://web.archive.org/web/20100128043248/http://msdn.microsoft.com/en-us/library/6hws6h2t.aspx.

"Domain Model." Wikipedia. 2 pages. Nov. 2, 2009. Online http://web.archive.org/web/20091102162025/http://en.wikipedia.org/wiki/Domain_model.

Esposito, "Cutting Edge: Custom Design-time Control Features in Visual Studio .NET." msdn—Microsoft. 11 pages. Jan. 27, 2010. Online. http://web.archive.org/web/20100127095555/http://msdn.microsoft.com/en-us/magazine/cc164048.aspx.

"Globally Unique Identifier." Wikipedia. 2 pages. Feb. 10, 2010. Online. http://web.archive.org/web/20100210053815/http://en.wikipedia.org/wiki/Globally_Unique_Identifier.

"How to: Add Controls to Windows Forms." msdn—Microsoft. 3 pages. Feb. 10, 2010. Online. http://web.archive.org/web/20100210130235/http://msdn.microsoft.com/en-us/library/0h5y8567.aspx.

"Java Core GUI APIs: How can I hierarchically save the GUI controls properties?" 7 pages. Sep. 23, 2007. Online. http://www.thatsjava.com/java-core-gui-apis/38066/.

Johnson, "Creating and Using Attributes in your .NET application." The Code Project. 8 pages. Feb. 9, 2002. Online. http://www.codeproject.com/KB/cs/dotnetattributes.aspx?display.

Kumar, et al., "Automatic Generation of Speech Interface for GUI Tools/Applications Using Accessibility Framework." 7 pages. Dec. 14, 2007.

Livshits, et al., "Reflection Analysis for Java." PowerPoint presentation, c. 2005. 38 slides.

Livshits, et al., "Reflection analysis for Java." Computer Science Department, Stanford University. 22 pages. Aug. 31, 2005.

"Getting Started: Leverage Custon Controls." Visual Studio Magazine. (Excerpted from Chapter 7, "Findows Forms Controls" of Stephen Perry's book "Core C# and .NET" (2005)). 5 pages. Jan. 1, 2006. Online. http://visualstudiomagazine.com/articles/2006/01/01/leverage-custom-controls.aspx.

"Observer Pattern." Wikipedia. 8 pages. Feb. 12, 2010. Online http://web.arch ive.org/web/20100212162441/http://en.wikipedia.org/wiki/Observer_pattern.

"Programming Paradigm." Wikipedia. 5 pages. Feb. 13, 2010. Online. http://web.archive.org/web/20100213110937/http://en.wikipedia.org/wiki/Programming_paradigm.

"Reflection (computer programming)." Wikipedia. 8 pages. Feb. 17, 2010. Online. http://en.wikipedia.org/w/index.php?title=Reflection_(computer_programming) &oldid=343739543.

"Reflection (C# Programming Guide)." msdn—Microsoft. 2 pages. Jan. 28, 2010. Online. http://web.archive.org/web/20100128061124/http://msdn.microsoft.com/en-us/library/ms173183.aspx.

Sobel, et al., "An Introduction to Reflection-Oriented Programming." Computer Science Department, Indiana University. 20 pages. Apr. 22, 1996.

SpeechStudio C++ product description, Hallogram Publishing, Feb. 20, 2002. 3 pages. Online. http://web.archive.org/web/20020220071431/http://hallogram.com/speechstudio/index.html.

"The Ultimate Tool for Software Development." Microsoft Visual Studio 2010 Ultimate. Jun. 2, 2010. 4 pages. Online. http://web.archive.org/web/20100602084651/http://www.software-intl.com/Software_Licensing_Resources_Docs/Microsoft/MSDN_Subscriptions/Microsoft-Visual-Studio-2010-Ultimate-Data-Sheet.pdf.

"UI Data Binding." Wikipedia. 1 page. Oct. 3, 2009. Online. http://en.wikipedia.org/w/index.php?title=UI_data_binding &oldid=317618617.

"Visual Basic .NET." Wikipedia. 9 pages. Jan. 24, 2010. Online. http://web.archive.org/web/200100124044920/http://en.wikipedia.org/wiki/Visual_Basic.Net.

"Visual FoxPro 8.0 Language Reference—hWnd Property." Microsoft Corporation. May 4, 2009. 1 page. Online. http://web.archive.org/web/20090504104559/http://msdn.microsoft.com/en-us/library/aa979055(v=vs.71).aspx.

"Visual Studio and Custom Controls Tutorials." brainbell. 9 pages. Dec. 23, 2009. Online. http://web.archive.org/web/20091223035449/http://www.brainbell.com/tutorials/ASP/Visual_Studio_and_Custom_Controls.html.

(56) References Cited

OTHER PUBLICATIONS

"Windows Forms Control Development Basics." *msdn—Microsoft*. 1 page. Jan. 16, 2010. Online. http://web.archive.org/web/20100116182554/http://msdn.microsoft.com/en-us/library/5437a_5437aee4(v=vs.80).aspx.

"Windows Forms Overview." *msdn—Microsoft*. 4 pages. Jan. 11, 2010. Online. http://web.archive.org/web/20100111145531/http://msdn.microsoft.com/en-us/library/8bxxy49h.aspx.

"Your Favorite IDE Just Got Better!" *Microsoft Visual Studio 2010 Professional*. 4 pages. 2010. Online. http://www.phytec.com/pdf/datasheets/Visual_Studio/Professional.pdf.

".NET Framework Conceptual Overview." *msdn—Microsoft*. 4 pages. Feb. 12, 2010. Online. http://web.archive.org/web/20100212043104/http://msdn.microsoft.com/en-us/library/zw4w595w.aspx.

* cited by examiner

ADDING SPEECH CAPABILITIES TO EXISTING COMPUTER APPLICATIONS WITH COMPLEX GRAPHICAL USER INTERFACES

CROSS REFERENCE TO RELATED APPLICATIONS

This application claims the benefit of U.S. Provisional Patent Application No. 61/444,340, filed Feb. 18, 2011, titled "Adding Speech Capabilities to Existing Computer Applications with Complex Graphical User Interfaces," the entire contents of which are hereby incorporated by reference herein, for all purposes.

TECHNICAL FIELD

The present invention relates to software development libraries, software development kits (SDKs), application programming interfaces (APIs) and other software components (collectively "software development tools") and, more particularly, to software development tools for adding speech recognition capabilities to existing graphical user interfaces.

BACKGROUND ART

Many computer programs have graphical user interfaces (GUIs), which allow users to interact with the programs using images rather than text commands. A GUI represents information and actions by displaying graphical icons and visual indicators on a screen. A user interacts with the GUI through manipulation of the graphical elements using a mouse, trackball, joystick, touch screen or other input device. For example, a user may control the location of a cursor displayed on the screen by moving a mouse. The user may indicate a choice by moving the cursor to an icon and pressing a button on the mouse ("clicking"). Similarly, the user may move the cursor to a location within a rectangle ("text box") displayed on the screen, click to select the text box and then enter text into the box by typing on a keyboard. GUIs employ metaphors, such as buttons, check boxes, radio buttons, text boxes, pull-down lists (drop-down boxes), etc. (collectively referred to as "controls"), to facilitate human-computer interaction. GUIs are widely used in personal computers, embedded systems, such as automatic teller machines (ATMs) and point-of-sale terminals, hand-held devices, such as mobile telephones and MP3 players, and the like.

Although GUIs represent a significant advance over purely text-based user interfaces, GUIs nevertheless suffer from some shortcomings. For example, a user must be able and willing to manipulate a mouse or other pointing device and, in most cases, enter text by typing on a keyboard. People who do not have use of their hands, either because of a physical disability or because their hands are dedicated to performing some other tasks, can not use GUIs.

Automatic speech recognition ("ASR" or "SR") technology converts spoken words into text. For example, Dragon Naturally Speaking speech recognition software from Nuance Communications, Inc., Burlington, Mass., may be used to dictate text into a word processing document or into a text box of a GUI, once the text box has been selected. In some cases, voice commands may be used to navigate among controls in a GUI. Two conventional approaches are available for speech-enabling a software application.

In one approach, a speech recognition application parses a displayed GUI at run time and attempts to identify controls, such as buttons and text boxes. The speech recognition application enables the user to navigate among the identified controls by uttering simple commands such as "Next field" and "Previous field." In some cases, the speech recognition application can identify text displayed near the controls. For example, if the GUI is displayed by a browser rendering a web page, the speech recognition application may parse HTML code of the web page. Text that is displayed adjacent a control may be assumed to be a label for the control. The user is then able to navigate to a control by uttering "Go to xxx," where "xxx" is the assumed label for the control. Once a control has been navigated to, the user may activate the control and/or use the control, such as by dictating into a text box.

However, correctly identifying displayed text as labels is error prone and sometimes impossible. For example, not all GUI controls have near-by text, and any near-by text may not actually correspond to the control and may not, therefore, provide a suitable navigation label for the control.

Advantageously, this approach to speech-enabling a GUI requires no effort on the part of a GUI developer. However, the navigation capabilities provided by this approach are limited to simple, i.e., "next" and "previous," navigation commands if suitable label text can not be identified. Furthermore, some GUIs include multiple pages or tabs, the contents of only one of which is displayed at a time. Such complex GUIs are often found in electronic medical record/electronic health record (EMR/EHR) and many other complex application programs. Unfortunately, using the first speech-enabling approach, it is not possible to navigate to, or activate, a control located on a page or tab other than the currently-displayed page or tab.

Another approach to speech-enabling a GUI provides richer and more complete speech navigation. However, this approach requires specifically designing the GUI for speech recognition. A developer who is skilled in voice user interface (VUI) design constructs a "dialog" that guides a user through voice interactions with the application. Thus, the speech recognition capabilities and programming are deeply integrated in the GUI. Furthermore, the language used to specify the voice interactions is distinct from the language used to describe the GUI. Although this approach can lead to a rich and sophisticated VUI, the development process is long, expensive and requires a skilled developer.

Application developers are, therefore, faced with a technical problem of speech-enabling complex GUIs, such as multi-page or multi-tab GUIs, without constructing speech dialogs when the GUIs are designed ("GUI design time").

SUMMARY OF EMBODIMENTS

An embodiment of the present invention provides a voice user interface controller (VUIcontroller) for automatically speech enabling a graphical user interface (GUI). The VUIcontroller includes a software component that is configured for inclusion in the GUI at design time of the GUI. The VUIcontroller is configured such that the software component is automatically executed at run time of the GUI. (The definition of "executed" includes "instantiated.") The software component is further configured to automatically perform several actions at run time of the GUI. The software component automatically analyzes the GUI from within a process that executes the GUI. The software component also automatically generates a voice command set corresponding to controls of the GUI. (A voice command set may be implemented as a speech recognition grammar, a search graph, a speech-recognition engine-embedded state machine or any other construct or process for recognizing speech.) The voice command set is generated from the analysis. The software component also automatically makes the generated voice command set available to a speech-recognition engine.

The software component may include a drag-and-drop tool for use in a visual GUI integrated design environment (IDE) or a routine callable from a GUI markup document.

The software component may be stored on a server other than a computer that renders the GUI at run time of the GUI. The computer that renders the GUI and the server may be interconnected, at least in part, by the Internet. At least a portion of the analysis of the GUI may be performed by the server.

The software component may be configured to automatically analyze the GUI by constructing a data structure representing the controls of the GUI.

The software component may be configured to respond to GUI run-time dynamic changes in the GUI by revising the generated voice command set according to the changes in the GUI. The revision to the voice command set may be according to at least one user-settable property. The user-settable property may be settable to a value by a user at design time of the GUI.

The software component may be configured to respond to GUI run-time dynamic changes in the GUI by generating a revised voice command set according to the changed GUI. The revised voice command set may be generated according to at least one user-settable property. The user-settable property may be settable to a value by a user at design time of the GUI.

The software component may be further configured to augment each of the controls of the GUI (at design time of the GUI) with at least one corresponding user-settable property. The user-settable property may be settable to a value by a user at design time of the GUI.

The at least one user-settable property may include text of a voice command for navigating to the corresponding control of the GUI or an indicator of whether the corresponding control of the GUI is to be speech enabled.

The at least one user-settable property may include a unique identifier associated with the control of the GUI. The software component may be further configured to store, at design time of the GUI, an identifier of a user-specified speech recognition grammar associated with the unique identifier.

The software component may be further configured to augment, at design time of the GUI, each of the controls of the GUI with a unique identifier usable to identify an associated speech recognition grammar.

The software component may be further configured such that the automatic analysis of the GUI is performed according to at least one user-settable property. The user-settable property may be settable to a value by a user at design time of the GUI.

The software component may be further configured such that the automatic generation of the voice command set is performed according to at least one user-settable property. The user-settable property may be settable to a value by a user at design time of the GUI.

The software component may be further configured such that the automatic making available of the generated voice command set to the speech-recognition engine is performed according to at least one user-settable property. The user-settable property may be settable to a value by a user at design time of the GUI.

Another embodiment of the present invention provides a method for automatically speech enabling a graphical user interface (GUI). According to the method, at run time of the GUI, a VUIcontroller is automatically executed. The VUI-controller was included in the GUI at design time of the GUI. The VUIcontroller automatically analyzes the GUI from within a process that executes the GUI and generates a voice command set corresponding to controls of the GUI, from the analysis of the GUI. The VUIcontroller also makes the generated voice command set available to a speech-recognition engine.

The VUIcontroller may be provided in a form of a drag-and-drop tool configured to be added to a visual GUI integrated development environment (IDE).

The GUI may be analyzed according to at least one user-settable property. The user-settable property may be settable to a value by a user at design time of the GUI.

The voice command set may be generated according to at least one user-settable property. The user-settable property may be settable to a value by a user at design time of the GUI.

The generated voice command set may be made available to the speech-recognition engine comprises according to at least one user-settable property. The user-settable property may be settable to a value by a user at design time of the GUI.

At run time of the GUI, in response to a change in the GUI, the generated voice command set may be revised, or a revised voice command set may be generated, according to the changes in the GUI. The revision or generation may be according to at least one user-settable property. The user-settable property may be settable to a value by a user at design time of the GUI.

Yet another embodiment of the present invention provides a non-transitory computer-readable medium having computer readable program code stored thereon for automatically speech enabling a graphical user interface (GUI). The stored program code includes program code for automatically executing a VUIcontroller at run time of the GUI. The VUI-controller was included in the GUI at design time of the GUI. The stored program code also includes program code for performing several operations as a consequence of the automatic execution of the VUIcontroller, including automatically analyzing the GUI from within a process that executes the GUI and automatically generating a voice command set corresponding to controls of the GUI, from the analysis of the GUI. Also included is program code for automatically making the generated voice command set available to a speech recognition engine.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
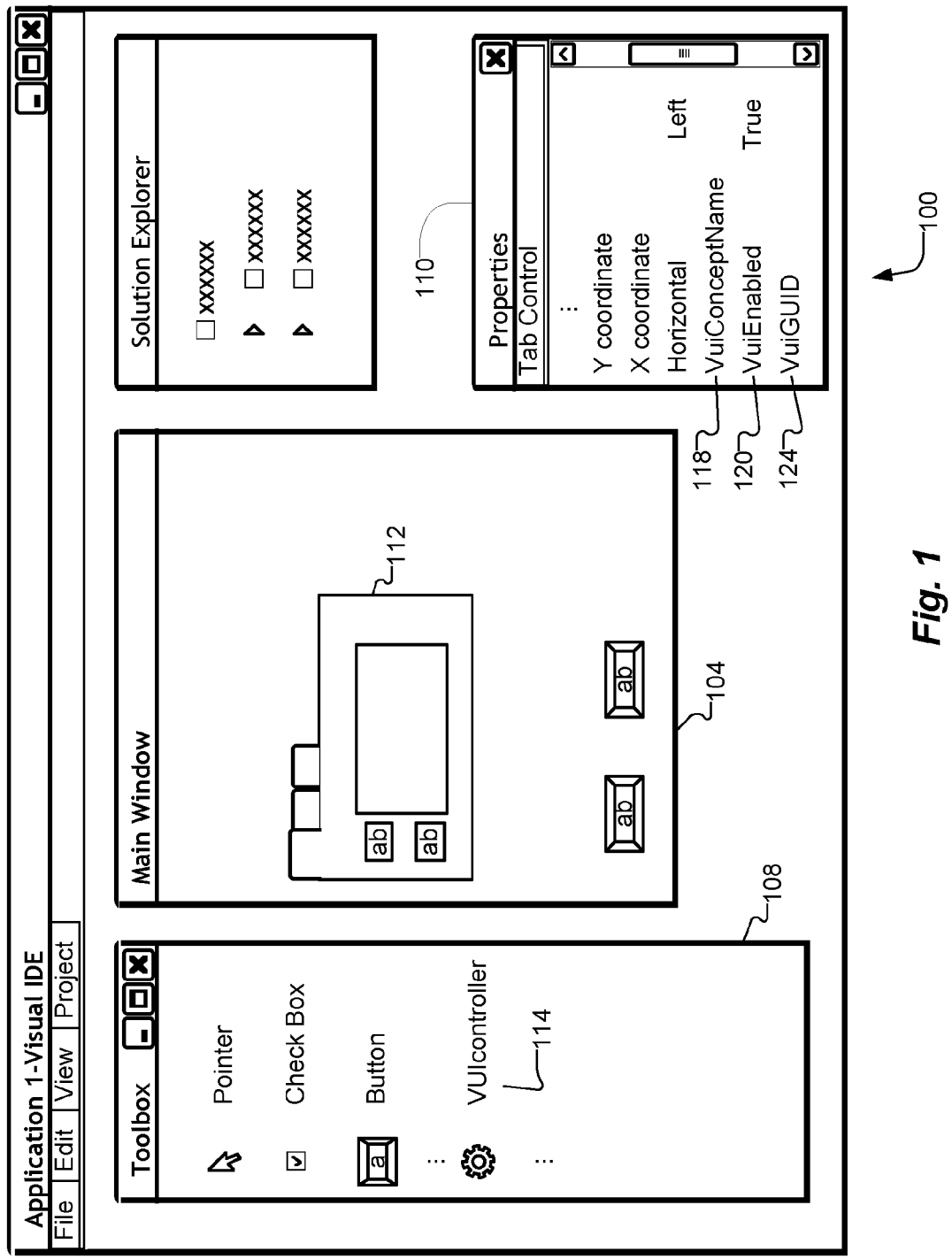
FIG. 1 is a schematic diagram of an exemplary user interface to a visual integrated development environment (IDE), as augmented according to an embodiment of the present invention.

In accordance with embodiments of the present invention, methods and apparatus are disclosed for automatically speech enabling a graphical user interface (GUI) of a computer application program, without requiring a GUI designer to construct a dialog that guides a user through voice interactions with the application. Instead, a voice command set is automatically generated at GUI run time by analyzing the GUI from within a process that executes the GUI. (A voice command set may be implemented as a speech recognition grammar, a search graph, a speech-recognition-engine-embedded state machine or any other construct or process for recognizing speech.) Because the GUI is analyzed from within the GUI process, all the GUI controls of the application are available for analysis, regardless of whether the controls are visible or not visible on the current window. Thus, the automatically-generated voice command set can encompass the entire GUI and enables the user to navigate to, and activate, GUI controls that are on windows and tabs that are not currently visible, without requiring the GUI designer to construct a voice command set.

Nevertheless, some embodiments enable the GUI designer to optionally and simply add speech-enabling properties to one or more of the GUI controls, or one or more global properties, at GUI design time, without necessarily writing a voice command set. These properties, if specified, may then be used at GUI run time to control or influence the analysis of the GUI and the automatic generation of the voice command set. For example, the GUI designer can specify a name or other command the user can utter to navigate to or activate the GUI control. The name or other command may be stored as a property of the corresponding GUI control. Another property may be used by the GUI designer to specify that a particular GUI control is to be, or is not to be, speech enabled. Another property may be used to control automatic regeneration of the voice command set in response to programmatic changes to the GUI by the application program. Yet another property may be used by the GUI designer to associate a particular voice command set, such as a pre-defined grammar, or a particular problem domain, such as electronic medical records (EMR) or a particular field of medicine, such as radiology or oncology, with a particular GUI control. These properties may then be used at GUI run time to control or influence the analysis and/or generation of the voice command set.

Thus, a complete GUI may be automatically speech-enabled, including GUI controls that are not on a currently visible page, without requiring the GUI designer to construct a voice command set. However, the GUI designer may control or influence speech-recognition aspects of selected GUI controls through the added GUI control properties, again without requiring the GUI designer to construct a voice command set. Consequently, the GUI designer obtains benefits of both prior art speech-enabling approaches, without incurring the penalties associated with the prior art.

Voice User Interface Controller (VUIcontroller)

According to some embodiments of the present invention, a "voice user interface controller" ("VUIcontroller") is used to automatically speech-enable a GUI. The VUIcontroller is a software component that is configured to be included in a GUI when the GUI is developed, i.e., at GUI design time. The VUIcontroller is further configured to be automatically instantiated or executed and connected to the GUI when the corresponding application program is executed and the GUI is displayed, i.e., at GUI run time.

At GUI run time, the VUIcontroller analyzes the GUI from within a process that executes the GUI. Analyzing from within the process that executes the GUI enables the VUIcontroller to access information about the entire GUI, not merely a currently displayed page or tab. From this analysis, the VUIcontroller automatically generates a voice command set that corresponds to controls of the GUI. The generated voice command set is made available to a speech recognition engine, thereby speech-enabling the GUI.

In some embodiments, such as when the GUI is being developed using an integrated development environment (IDE), the VUIcontroller may be implemented as a drag-and-drop tool that can be dropped into a GUI under development. In other embodiments, such as web-based GUIs, the VUIcontroller may be implemented as a routine, such as a script written in JavaScript, that is callable from a GUI markup document, such as a web page written in the HyperText Markup Language (HTML).

The VUIcontroller may be stored on the same computer that renders the GUI at run time or on a server other than the computer that renders the GUI at run time. For example, the VUIcontroller may be stored on a server that is accessible by the GUI-rendering computer at least partially via the Internet. The VUIcontroller, or a portion of the VUIcontroller, may be downloaded from the server to the GUI-rendering computer for execution. The automatic analysis and/or automatic voice command set generation may be performed by the VUIcontroller on the GUI-rendering computer or on another server. For example, a downloaded portion of the VUIcontroller may send raw data describing the GUI to a remotely executed portion of the VUIcontroller for analysis.

In some cases, such as when part or all of the VUIcontroller is executed on a remote computer, services of the VUIcontroller may be provided by a third party commercial entity for a fee, such as under a license agreement. Thus, a company may provide a speech-enabled GUI by calling the VUIcontroller, without necessarily providing the VUIcontroller. The provider of the VUIcontroller may implement improvements in the VUIcontroller, without requiring the GUI application program to be modified or rebuilt. In such a case, the GUI application program obtains benefits from the improved VUIcontroller transparently.

Similarly, the speech-recognition engine that processes the automatically-generated voice command set may be executed by the same computer that executes the GUI or a different computer, such as a computer accessible via the Internet. In some cases, such as when the speech-recognition engine resides on a remote computer, services of the speech-recognition engine may be provided by a third party commercial entity for a fee, such as under a license agreement. Thus, a company may provide a speech-enabled GUI without necessarily also providing the speech-recognition engine. The provider of the speech-recognition engine may implement improvements in the speech-recognition engine, without requiring the GUI application program to be modified or rebuilt. In such a case, the GUI application program obtains benefits from the improved speech-recognition engine transparently.

Some embodiments of the present invention will now be described in greater detail.

VUIcontroller Implemented as a Drag-and-Drop Tool

Some GUI developers use visual IDEs, such as Visual Studio 2010 software from Microsoft Corporation, Redmond, Wash. 98052-6399, to design GUIs. An IDE is a software application that provides comprehensive facilities to computer programmers for software development. An exemplary user interface 100 to a visual IDE is shown schematically in FIG. 1. The IDE includes a window ("design pane") 104 that graphically represents a GUI under development, as well as another window ("toolbox") 108 that display tools, such as GUI controls that can be dragged by the developer from the toolbox 108 and dropped into the design pane 104. The IDE may include other windows, such as a "properties" window 110, in which the IDE displays, and the GUI developer may browse and, in appropriate cases, edit values of properties associated with GUI controls and other objects that have been added to the GUI under development. In the properties window 110, the IDE displays a scrollable list of properties and corresponding property values, if they have been defined or defaulted, associated with a GUI control or other object, such as a tab control 112, that has been selected in the design pane 104. Exemplary prior art properties include X and Y coordinates within the eventual run-time GUI window of a corner of each control.

As noted, the VUIcontroller may be implemented as a drag-and-drop tool 114 that the GUI developer can drag from the toolbox 108 and drop into the GUI design pane 104. Dropping the VUIcontroller 114 into the design pane 104 causes the IDE to add the VUIcontroller software component to the GUI under development, in the same, or similar, manner as the IDE adds other dragged-and-dropped tools, such as GUI controls. For example, adding the VUIcontroller 114 to the GUI under development may involve adding a class definition for the VUIcontroller to the GUI. The IDE adds the VUIcontroller to the GUI under development according to the GUI framework, under which the GUI is being developed. Exemplary GUI frameworks include .NET WinForms, Windows Presentation Foundation (WPF), Swing, ActiveX, iOS/Objective C, Java and Win32 hwnd-based frameworks.

Typically, the VUIcontroller 114 needs to be added only once to a GUI application under development, even if the GUI includes more than one window, page or tab. The IDE may, but need not, display an icon in the GUI design pane 104 to indicate the VUIcontroller 114 has been added to the GUI under development.

Optionally, once the VUIcontroller 114 has been dropped into the GUI design pane 104, the VUIcontroller may extend GUI controls, such as buttons and drop-down lists, with additional custom properties. Optionally or additionally, the VUIcontroller may extend the GUI with global properties, i.e., properties that are not tied to particular GUI controls. The GUI developer may then easily give values to these properties using the IDE's properties browser 110. Three exemplary added properties 118, 120 and 124 are shown; however, other additional properties and other numbers of additional properties may be added, and other names for the described properties may be used. The three exemplary additional properties will now be discussed in more detail.

The VuiConceptName property 118 may be used to allow the GUI developer to specify a voice command or a list of alternative voice commands that a user will be able to utter to navigate to the associated GUI control. In one embodiment, the VuiConceptName value may be entered by the GUI developer as a text string, with a predetermined character, such as vertical bar ("|"), to separate alternative voice commands. For example, in a travel-related application, a destination control may have a VuiConceptName value of "destination | I want to travel to | my destination is." The default value for the VuiConceptName property may be null.

The VuiEnabled property 120 may take one of two Boolean values, "true" and "false," to indicate whether the corresponding GUI control should be speech-enabled or not. The default value may be "true."

The GUI developer may add the VuiGUID property 124 to selected GUI controls. Optionally, the VUIcontroller 114 may automatically add the VuiGUID property 124 to each GUI control in the application. In either case, at GUI design time, the VUIcontroller 114 assigns a unique value, such as a globally unique identifier (GUID), to each VuiGUID property 124. Thus, the VuiGUID properties uniquely identify the associated GUI controls, at least within the application. The values used for the VuiGUID property 124 may, but need not, be 32-character hexadecimal stings.

The GUI developer may associate a voice command set or an individual grammar concept (i.e., one or more phrases that can be recognized when the grammar is active), such as in a pre-existing grammar or in a grammar expected to be available to the speech-recognition engine at GUI run time, with a particular VuiGUID value, thereby associating the voice command set or grammar concept with the GUI control having that VuiGUID property value. Most existing speech-recognition engines allow the association of individual grammar concepts with semantic attributes that are returned by the speech-recognition engine, together with a recognized phrase. The concrete VuiGUID value can be stored in such a semantic attribute. Thus, at GUI run time, if a user-uttered command is recognized using a speech-recognizer grammar associated with a VuiGUID value, the VUIcontroller is notified, and the VUIcontroller activates the GUI control associated with the VuiGUID value. For example, if the GUI control is a button, the VUIcontroller simulates a button click.

The GUI developer may add other properties and associated property values to GUI controls. For example, if a text box or pull-down control relates to a particular problem domain, such as radiology, oncology or automobile repair, a VuiDictationTopic property value may be set by the GUI developer to an appropriate value, such as a code or a text string that represents the problem domain. The value of this property may then be used at GUI run time to select an appropriate voice command set to increase speech recognition accuracy. Similarly, if the semantics of a field are known at GUI design time, the GUI developer may set a property value to store information about the semantics. For example, if valid values that can be entered into a field must fall within set boundaries, such as systolic blood pressure or body temperature, the property may be used to automatically select a voice command set that recognizes only utterances of numeric information within that range. For example, VuiSemantics="bodytemperature" may be used to restrict recognition to values between 90° F. and 110° F. or 35° C. and 42° C.

The description of custom properties (above) is phrased in the context of a .NET WinForms framework. In other frameworks, other well-known concepts may be used to achieve similar results. For example, in iOS/Objective C, extension interfaces may be used to implement these properties.

The VUIcontroller 114 may be provided by the IDE provider, or the VUIcontroller 114 may be added to the IDE's toolbox 108 as a custom tool. Instructions for adding custom tools to IDEs are typically provided by the IDEs' providers.

VUIcontroller Implemented as a Callable Script

Figure 2:
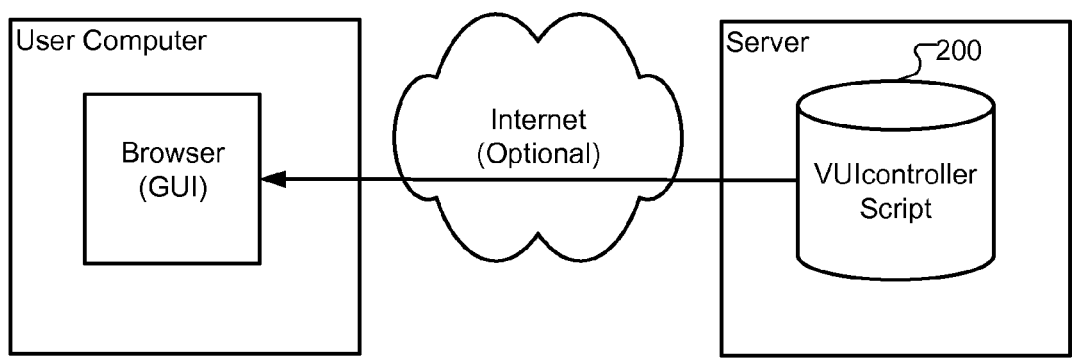
FIG. 2 is a schematic block diagram of a browser coupled to a server, from which a VUIcontroller script may be served, according to an embodiment of the present invention.

As noted, in other embodiments, the VUIcontroller may be implemented as a routine, such as a script written in JavaScript, that is callable from a GUI markup document, such as an HTML document. Also as noted, the script may be stored on the same computer that renders the GUI or on another computer, including a computer accessible to the GUI-rendering computer via the Internet. A block diagram of such an arrangement is shown schematically in FIG. 2. The VUIcontroller script 200 may be invoked from a JavaScript file that contains code that hooks into the "on Load" event and is included in a web page via an HTML statement such as:

```
<script type="text/javascript"
    src="http://danube.nuancehce.com/Nuance.SpeechAnywhere.js">
</script>
```

The on Load event handler is used to execute a JavaScript after a page, frame or image has completely loaded. Thus, the VUIcontroller is executed after the GUI page has loaded and all the GUI controls of the page are accessible to the VUIcontroller for analysis.

Properties, such as the VuiConceptName property described above, may be defined as "data" attributes in HTML 5, as in, for example:
 data-VuiConceptName="destination |I want to travel to |my destination is"

Automatic Speech-Recognition Command Set Generation at GUI Run Time

Figure 3:
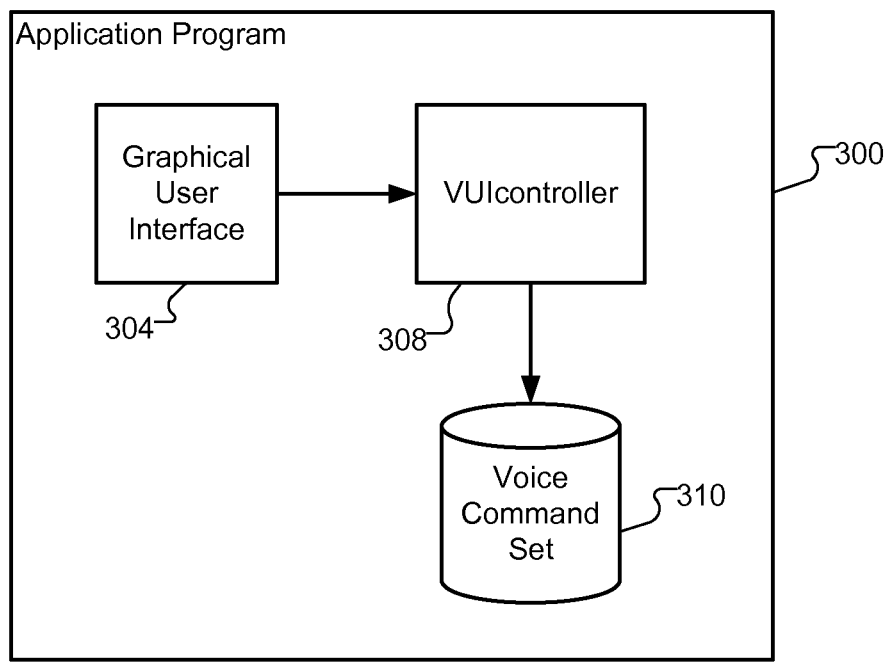
FIG. 3 is a schematic block diagram of an application program that includes a graphical user interface (GUI) that includes an instantiated VUIcontroller object, according to an embodiment of the present invention.

When the application program that includes the developed GUI is executed, the VUIcontroller is executed or instantiated within a process that executes the GUI. For example, if the dropped-in VUIcontroller 114 (FIG. 1) is a class, at GUI run time the GUI framework instantiates the VUIcontroller and associates the instantiated object with the GUI onto which the VUIcontroller 114 had been dropped. Thus, the VUIcontroller object can refer to other objects in the GUI, such as labels and controls. FIG. 3 is a schematic block diagram of an application program 300 that includes a GUI 304 that was designed, as described above, and an instantiated VUIcontroller object 308. The VUI controller object 308 analyzes the GUI 304 and automatically generates a voice command set 310 from the analysis.

In one embodiment, to generate the voice command set 310, a constructor routine in the VUIcontroller object 308 is executed when the VUIcontroller object 308 is instantiated. As noted, in HTML-based applications, the VUIcontroller may be executed by, or within, a JavaScript hooked to the "on Load" event. Similar techniques for executing or instantiating the VUIcontroller upon execution of the GUI 304 are available in other GUI frameworks. For simplicity of explanation, the VUIcontroller is referred to below as the VUIcontroller object 308, regardless of the GUI framework involved.

Figure 4:
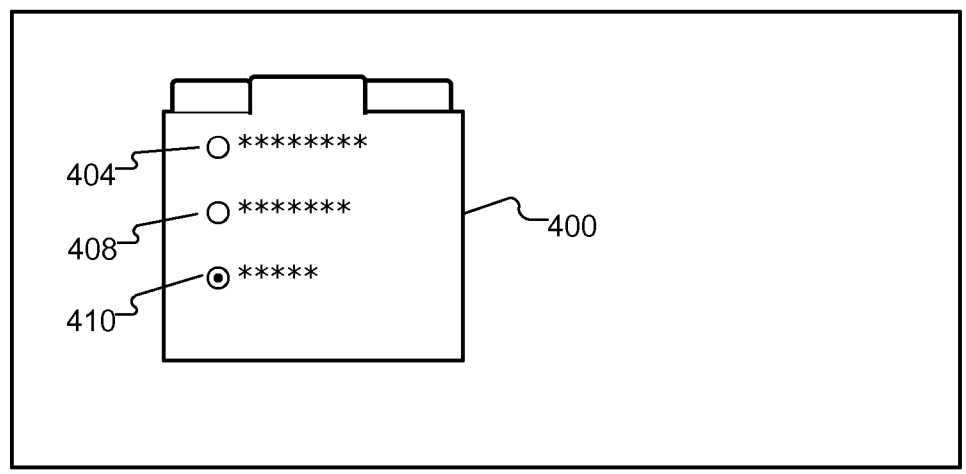
FIGS. 4-6 are schematic diagrams of a hypothetical three-window GUI.
Figure 5:
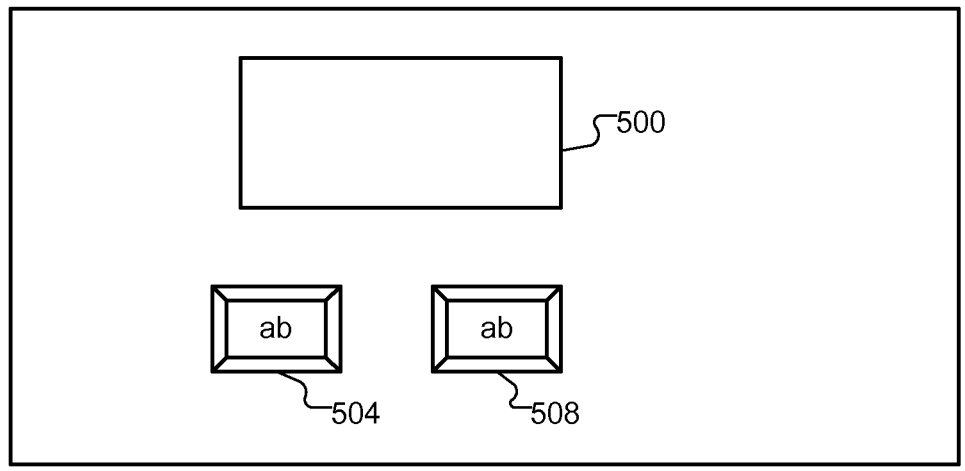
Figure 6:
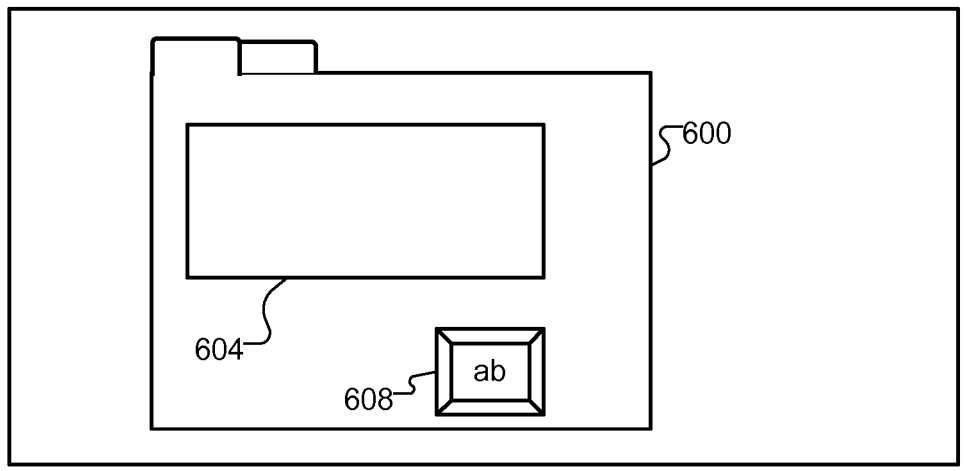

The VUIcontroller object 308 automatically generates a hierarchical (tree) representation of the GUI 304, as will now be described using a hypothetical three-window GUI shown schematically in FIGS. 4, 5 and 6, and then the VUIcontroller object 308 automatically generates a voice command set 310 from the hierarchical representation. As shown in FIG. 4, the first window includes a three-tabbed tab control 400. The middle tab includes three radio buttons 404, 408 and 410. As shown in FIG. 5, the second window of the GUI includes a text box 500 and two buttons 504 and 508. As shown in FIG. 6, the third window includes a two-tabbed tab control 600. The first tab includes a text box 604 and a button 608.

Figure 7A:
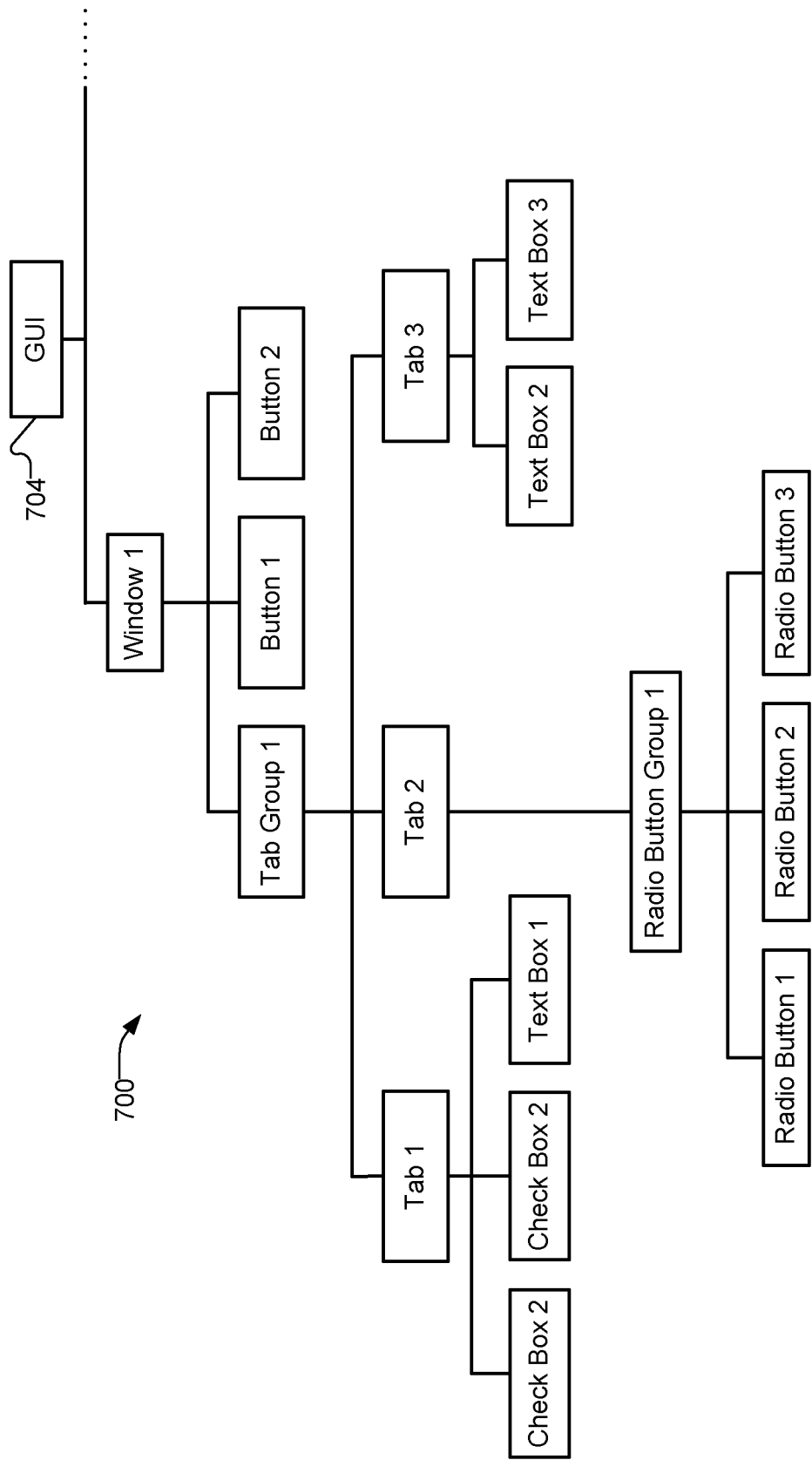
FIGS. 7A and 7B collectively show a hierarchical representation of controls in the GUI of FIGS. 4-6, according to an embodiment of the present invention.
Figure 7B:
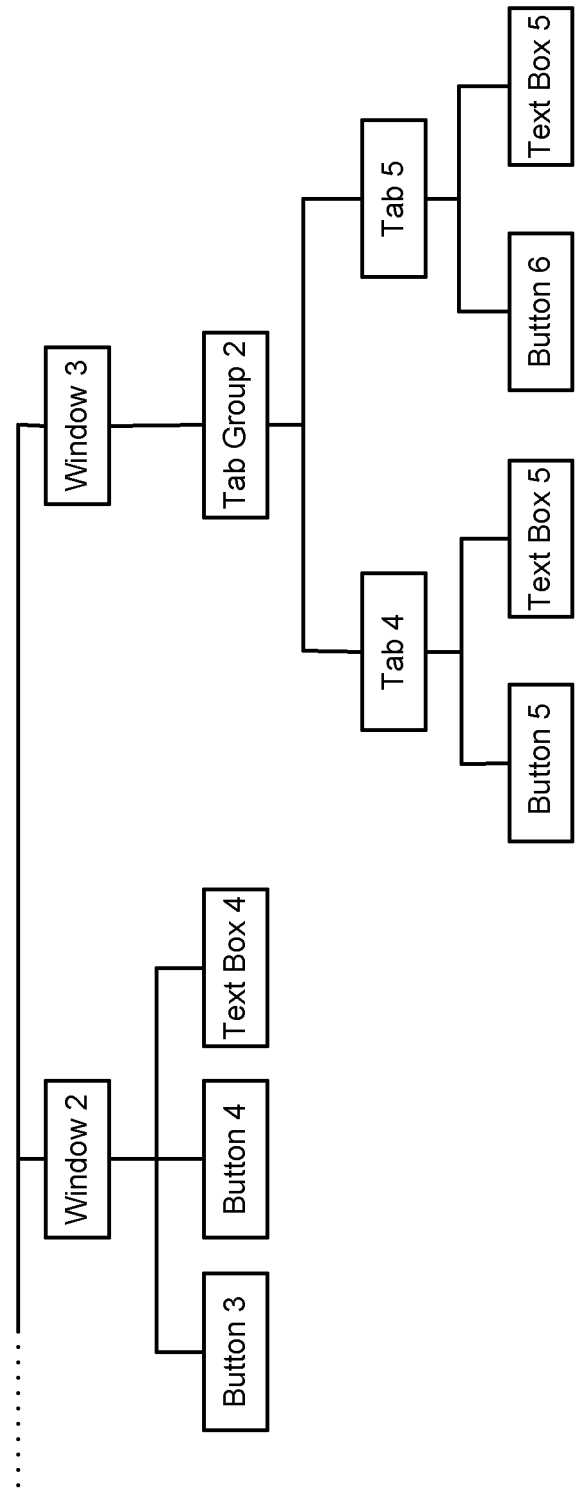

The VUIcontroller object 308 (FIG. 3) analyzes the GUI (FIGS. 4-6) and generates a hierarchical representation 700, as shown in FIGS. 7A and 7B, of the controls in the GUI 304 (FIG. 3). This representation 700 may, but need not necessarily, include text, such as labels, in the GUI. The root 704 of the hierarchical representation 700 corresponds to the GUI 304 (FIG. 3). Successive nodes of the hierarchical representation 700 correspond to windows, tab groups, tabs, buttons, text boxes, etc.

The VUIcontroller object 308 may, for example, use the well-known process known as "reflection" to observe the structure of the GUI 304. The VUIcontroller object 308 may use a reference, passed to the VUIcontroller object upon instantiation, to the GUI 304 as a starting point for an inspection/reflection operation that allows the VUIcontroller object 308 to analyze the entire GUI 304 and identify all controls in the GUI 304.

Optionally or alternatively, the VUIcontroller object 308 may generate a non-hierarchical representation (not shown) of the controls in the GUI. Any form of representation that includes information about the relationships among the controls of the GUI 304 may be used. For simplicity of explanation, the representation is referred to as a hierarchical representation 700.

The VUIcontroller object 308 augments the information in the hierarchical representation 700 with information about the controls, as stored in the controls' properties. For example, if the GUI developer gave a value to the VuiConceptName property 118 (FIG. 1) for a particular control at GUI design time, the VUIcontroller object 308 stores this value in the corresponding node of the hierarchical representation 700. For example, continuing the example described above with respect to the VuiConceptName property and FIG. 1, "destination," "I want to travel to" and "my destination is" are added to the node that corresponds to the destination control.

If no VuiConceptName property 118 was defined for a control, but the analysis of the GUI 304 reveals that the GUI 304 includes text adjacent a control, the text may be used as a label for the control, and VUIcontroller object 308 adds the label text to the hierarchical representation 700. Thus, the user may navigate to the control with a speech command such as "Go to xxx," where "xxx" is the label for the control. However, unlike the prior art, these navigation commands are available regardless of on which window, page or tab the control appears, because the VUIcontroller object 308 has access to the entire GUI 304 for analysis. In contrast, prior art run-time GUI analysis is performed from outside the application and, therefore, only the currently displayed window, page or tab is accessible for analysis, and cross-page navigation by speech is not possible.

To enable voice navigation to controls for which no VuiConceptName property value was specified and no appropriate text label is identified, the voice command set 310 may include relative navigation commands, such as "Next" and "Previous."

A "tab order" of the controls may be stored in the hierarchal representation 700. This tab order may be derived from the GUI framework, if the framework supports a tab order. For example, such a tab order is typically specified during GUI design time in an IDE.

Other property values, such as VuiEnabled 120 and VuiGUID 124 (FIG. 1), are also stored in the hierarchical representation 700. If the value of the VuiEnabled property 120 (FIG. 1) for a control is "false," the VUIcontroller object 308 omits automatically generating voice command set 310 information for the control, thereby making the control not speech-enabled.

Figure 8:
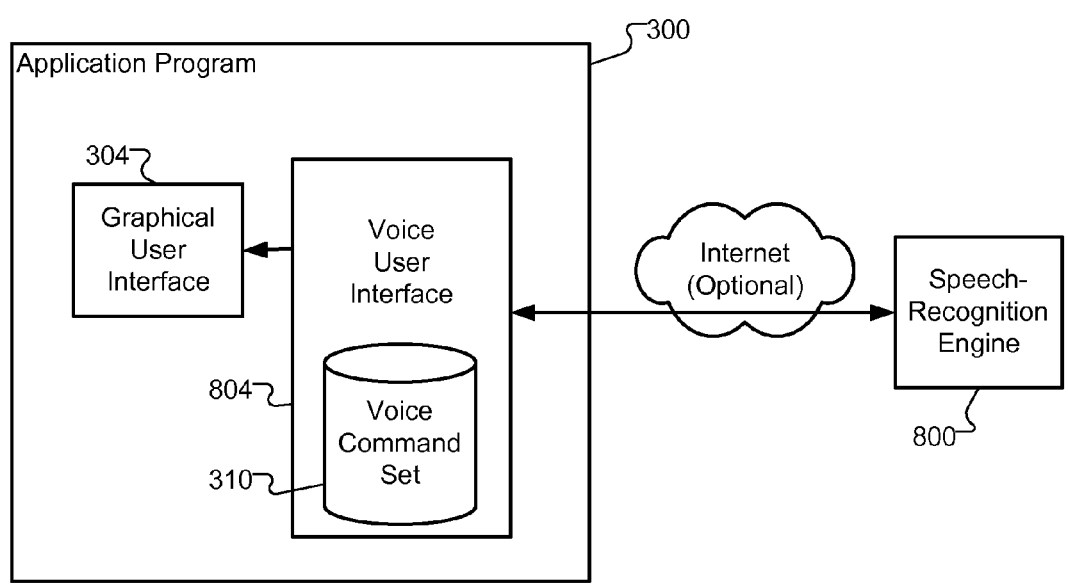
FIG. 8 is a schematic block diagram of the application program of FIG. 3 coupled to a speech-recognition engine and using a voice command set automatically generated from the representation of FIGS. 7A and 7B, according to an embodiment of the present invention.

Once the hierarchical representation 700 of the GUI 304 has been generated, the VUIcontroller object 308 automatically generates the voice command set 310 (FIG. 3) from information in the representation 700 of the GUI. As shown schematically in FIG. 8, once the voice command set 310 has been generated and a speech-recognition engine 800 has been invoked, the VUIcontroller object 308 provides a user interface (VUI) 804 to the user. The VUI 804 makes the voice command set 310 available, and passes user utterances, to the speech-recognition engine 800. The speech-recognition engine 800 recognizes the utterances according to the voice command set 310 (if possible) and generates text. The text is returned to the VUI 804, which causes the GUI 304 to be navigated and controls to be operated, as appropriate.

As noted, the speech-recognition engine 800 may be executed by a server remote from the computer that executes the application program 300. Alternatively, the speech-recognition engine 800 may be executed by the same computer that executes the application program 300.

Some GUI frameworks enable an application to programmatically create, modify or delete GUI controls at GUI run time. Such a dynamic GUI may be used, for example, in an EMR/EHR application to add or delete fields based on, for example, gender of a patient or answers to questions about the patient's history. Optionally, the VUIcontroller object 308 is configured to respond to such changes by creating a new hierarchical representation 700 (FIG. 7) of the changed GUI and then generating a new voice command set 310 from the new representation 700 or by modifying the existing representation 700 and voice command set 310. In either case, the VUI 804 dynamically changes according to the then-current GUI 304.

Although an IDE may display an icon in the GUI design pane 104 during GUI design time to indicate the VUIcontroller 114 has been added to the GUI under development, no GUI control or other indicator needs to be displayed in the GUI 304 at run time to indicate the VUIcontroller 308 is present, unless for marketing or similar purposes such an indicator is desired. For example, the VUIcontroller object 308 may be represented by an icon that displays a speech-recognition vendor's logo. A user of the application GUI 304 does not need to directly interact with the VUIcontroller 308 as a GUI element, such as by clicking on it. However, optionally, clicking the VUIcontroller icon (if one is displayed) may display information about the speech-recognition vendor or automatically open a browser window and invoke a link to the vendor's web site.

Figure 9:
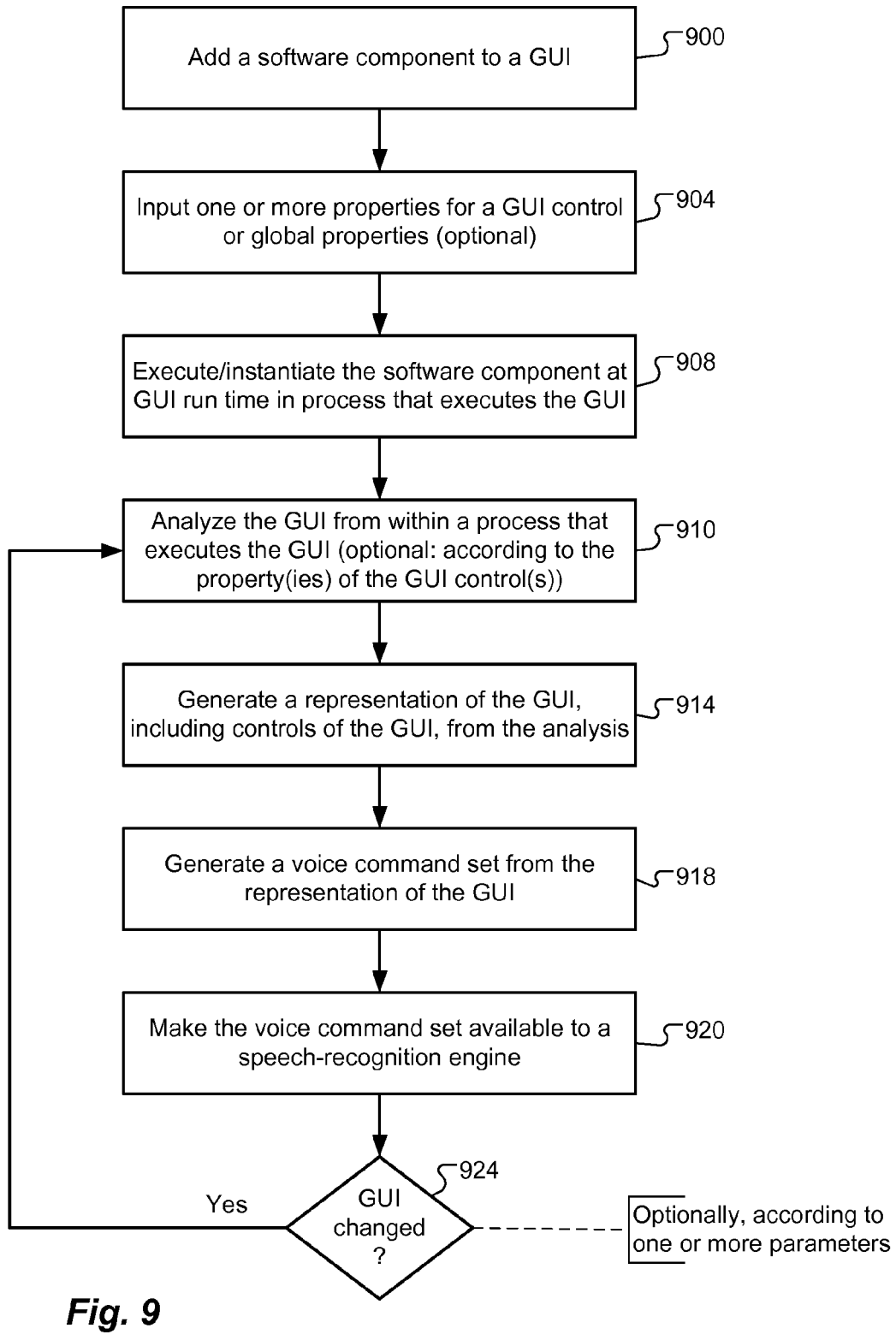
FIG. 9 is a schematic flowchart summarizing operations involving the VUIcontroller of FIGS. 1-3 and 8, i.e., a method for automatically speech-enabling a GUI, according to an embodiment of the present invention.

FIG. 9 is a flowchart summarizing operations involving the VUIcontroller, i.e., a method for automatically speech-enabling a graphical user interface (GUI). At 900, the VUIcontroller (a software component) may be added to a GUI, such as by dropping the VUIcontroller into the GUI in an IDE or by adding a call to a JavaScript script to an HTML document. Optionally, at 904, one or more properties may be defined for one or more GUI controls and/or one or more global properties may be defined. A user may define these properties, such as via the IDE. The property(ies) may be used later to control or influence automatic analysis of the GUI, automatic generation of a voice command set for the GUI, automatic provision of the generated voice command set to a speech-recognition engine, automatic revision, re-performance or regeneration of the GUI analysis, voice command set or provision of the grammar to the speech-recognition engine.

At 908, the software component may be executed or instantiated (collectively herein referred to as "executed") at GUI run time in the same process as executes the GUI. This may involve downloading the software component from a server, including a server coupled via the Internet to a computer that executes the GUI. At 910, the software component automatically analyzes the GUI from within the process that executes the GUI. Optionally, the analysis may be controlled or influenced by one or more of the properties that were defined for one or more of the GUI controls or a global property. For example, if a property, such as VuiEnable, has a value of "false," in association for a given GUI control, the control may be omitted from the eventually automatically generated voice command set.

The analysis may be performed solely by the computer that executes the GUI or partially by another computer, such as the server from which the software component was downloaded. For example, the downloaded software component may inspect the GUI from within the process that executes the GUI and send information derived from the inspection to a remote server for further analysis. Nevertheless, the functions performed by the software component within the process that executes the GUI are referred to herein as analyzing the GUI from within a process that executes the GUI.

At 914, a representation, such as a hierarchical representation, of the GUI, is automatically generated according to the analysis. The representation includes information about the controls of the GUI. Optionally, the generation of the representation may be controlled or influenced by one or more of the properties that were defined for one or more of the GUI controls or a global property. The representation may be generated by the same computer that executes the GUI or by another computer, such as the server from which the software component may have been downloaded.

At 918, a voice command set is automatically generated from the representation of the GUI. Again, optionally, the generation of the grammar may be controlled or influenced by one or more of the properties that were defined for one or more of the GUI controls or a global property. For example, a property may specify a problem domain, which may be used to constrain the universe of user utterances or to select a dictionary, thesaurus or ontology to identify alternative or additional words or phrases to be included in the voice command set for a given input field or control or to identify groups of fields in the GUI that are semantically related. For example, if an application is identified as being related to health care and the GUI includes two fields labeled "systolic" and "diastolic," the VUI controller may generate a voice command set that accepts "blood pressure" followed by two numbers, optionally separated by "over," as a single utterance. The two recognized numbers are automatically entered in to the systolic and diastolic fields.

The voice command set may be generated by the same computer that executes the GUI or by another computer, such as the server from which the software component may have been downloaded. Using a separate computer facilitates improving the analysis capabilities, without rebuilding the application, such as by augmenting the dictionary, thesaurus or ontology or the logic of the analyzer.

At 920, the voice command set is made available to an automatic speech-recognition engine. Aspects of how the voice command set is made available to the speech-recognition engine may be controlled or influenced by one or more properties. The speech-recognition engine may be executed on the same computer that executes the GUI or on a different computer. For example, digitized or partially recognized speech may be sent to the remote server for recognition, and corresponding recognized speech (in the form of text) may be returned to the GUI-executing computer. Utterances by a user are recognized by the speech-recognition engine, according to the voice command set, and the software component invokes appropriate controls, and fills in appropriate fields, of the GUI, according to the recognized utterances.

If the GUI is changed, such as programmatically by an application program, at 924, control may return to 910, and the representation and voice command set may be modified or generated anew. Whether control returns to 910 and aspects of the modification or generation of the representation or voice command set may be controlled or influenced by one or more of the properties that were defined for one or more of the GUI controls or by one or more global properties.

In some embodiments, the VUIcontroller may be implemented as a drag-and-drop tool or as a callable script, as described. In these and some other embodiments, the VUIcontroller may include or be part of a software development library, software development kit (SDK), application programming interfaces (API) and/or other software component (collectively "software development tool") that may be integrated into a third-party application program. Although addition of a VUIcontroller to a GUI-based application has been described in the context of dragging-and-dropping in a visual IDE and by adding a call to an HTML document, other mechanisms may be used. For example, a wizard may be used to modify an existing application program by adding code to the application program and rebuilding the application program.

A VUIcontroller may be embodied as software that may be stored in a memory and executed by a processor controlled by instructions stored in the memory. The memory may be random access memory (RAM), read-only memory (ROM), flash memory or any other memory, or combination thereof, suitable for storing control software or other instructions and data. Some of the functions performed by the VUIcontroller have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable tangible storage media (e.g. read-only memory devices within a computer, such as ROM, or devices readable by a computer I/O attachment, such as CD-ROM or DVD disks), information alterably stored on writable tangible storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of VUIcontroller have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. Non-transitory computer-readable medium comprising computer-readable instructions that, when executed by a computer, adapt the computer to:

provide a voice user interface controller (VUIcontroller) for automatically speech enabling a graphical user interface (GUI) at run time of the GUI;

configure a user interface of the computer to receive first input from a GUI designer that identifies and includes the VUIcontroller in the GUI while designing the GUI so that the VUIcontroller will execute at run time of the GUI;

configure the user interface of the computer to receive second input from the GUI designer that identifies and assigns, at design time of the GUI, at least one voice-enabling property to a first GUI control of the GUI;

configure the user interface of the computer to receive third input from the GUI designer that identifies and disables, at design time of the GUI, voice control of a second GUI control of the GUI, wherein the VUIcontroller comprises instructions that are automatically executed at run time of the GUI to automatically:

analyze the GUI from within a process that executes the GUI;

generate a voice-enabled GUI based on the analysis;

generate, from the analysis, a voice command set corresponding to voice-enabled controls of the GUI; and make the generated voice command set available to a speech-recognition engine.

2. The non-transitory computer-readable medium of claim 1, wherein the computer-readable instructions, when executed, further adapt the computer to provide a drag-and-drop tool for use in a visual GUI integrated design environment (IDE) to include the VUIcontroller in the GUI.

3. The non-transitory computer-readable medium of claim 1, wherein the computer-readable instructions for the VUIcontroller comprise a routine callable from a GUI markup document.

4. The non-transitory computer-readable medium of claim 3, wherein the computer-readable instructions are stored on a server other than a computer that renders the GUI at run time of the GUI, wherein the computer that renders the GUI and the server are interconnected, at least in part, by the Internet.

5. The non-transitory computer-readable medium of claim 4, wherein at least a portion of the analysis of the GUI is performed by the server.

6. The non-transitory computer-readable medium of claim 1, wherein the computer-readable instructions for the VUIcontroller, when executed, further adapt the computer to automatically analyze the GUI by constructing a data structure representing the controls of the GUI.

7. The non-transitory computer-readable medium of claim 1, wherein the computer-readable instructions for the VUIcontroller, when executed, further adapt the computer to respond, at run time of the GUI, to dynamic changes in the GUI by revising the generated voice command set according to the changes in the GUI.

8. The non-transitory computer-readable medium of claim 1, wherein the computer-readable instructions for the VUIcontroller, when executed, further adapt the computer to respond, at run time of the GUI, to dynamic changes in the GUI by revising the generated voice command set according to the changes in the GUI and according to at least one user-settable property, the user-settable property being settable to a value by the GUI designer at design time of the GUI.

9. The non-transitory computer-readable medium of claim 1, wherein the computer-readable instructions for the VUI-controller, when executed, further adapt the computer to respond, at run time of the GUI, to dynamic changes in the GUI by generating a revised voice command set according to the changed GUI.

10. The non-transitory computer-readable medium of claim 1, wherein the computer-readable instructions for the VUIcontroller, when executed, further adapt the computer to respond, at run time of the GUI, to dynamic changes in the GUI by generating a revised voice command set according to the changed GUI and according to at least one user-settable property, the user-settable property being settable to a value by the GUI designer at design time of the GUI.

11. The non-transitory computer-readable medium of claim 1, wherein the computer-readable instructions, when executed, further adapt the computer to augment, at design time of the GUI, each of the controls of the GUI with at least one corresponding user-settable property, the user-settable property being settable to a value by the GUI designer at design time of the GUI.

12. The non-transitory computer-readable medium of claim 11, wherein the at least one user-settable property comprises text of a voice command for navigating to the corresponding control of the GUI.

13. The non-transitory computer-readable medium of claim 11, wherein the at least one user-settable property comprises an indicator of whether the corresponding control of the GUI is to be speech enabled.

14. The non-transitory computer-readable medium of claim 11, wherein:
the at least one user-settable property comprises a unique identifier associated with the control of the GUI; and
the computer-readable instructions, when executed, further adapt the computer to store, at design time of the GUI, an identifier of a user-specified speech recognition grammar associated with the unique identifier.

15. The non-transitory computer-readable medium of claim 1, wherein the computer-readable instructions, when executed, further adapt the computer to augment, at design time of the GUI, each of the controls of the GUI with a unique identifier usable to identify an associated speech recognition grammar.

16. The non-transitory computer-readable medium of claim 1, wherein the automatic analysis of the GUI, when executed, is performed according to at least one user-settable property, the user-settable property being settable to a value by the GUI designer at design time of the GUI.

17. The non-transitory computer-readable medium of claim 1, wherein the automatic generation of the voice command set is performed according to at least one user settable property, the user-settable property being settable to a value by the GUI designer at design time of the GUI.

18. The non-transitory computer-readable medium of claim 1, wherein the automatic making available of the generated voice command set to the speech-recognition engine is performed according to at least one user-settable property, the user-settable property being settable to a value by the GUI designer at design time of the GUI.

19. The non-transitory computer-readable medium of claim 1, wherein the computer-readable instructions, when executed, further adapt the computer to enable the GUI designer to specify more than one voice command for a GUI control.

20. The non-transitory computer-readable medium of claim 1, wherein the computer-readable instructions, when executed, further adapt the computer to enable the GUI designer to identify a predefined grammar for a GUI control.

21. A method for automatically speech enabling a graphical user interface (GUI), the method comprising:
at design time of the GUI, receiving first input from a GUI designer for design of the GUI;
at design time of the GUI, including a VUIcontroller in the GUI that will be executed at run time of the GUI;
at design time of the GUI, receiving second input the GUI designer that specifies a voice-enabling property of a first control of the GUI being designed;
at design time of the GUI, receiving third input from the GUI designer that disables voice control of a second control of the GUI being designed;
at run time of the GUI, automatically executing the VUI-controller that was included in the GUI at design time of the GUI, wherein the VUIcontroller instantiates acts of:
analyzing the GUI from within a process that executes the GUI;
generating a voice-enabled GUI based on the analysis;
generating, from the analysis of the GUI, a voice command set corresponding to voice-enabled controls of the GUI; and
making the generated voice command set available to a speech-recognition engine.

22. A method according to claim 21, further comprising providing the VUIcontroller in a form of a drag-and-drop tool configured to be added to a visual GUI integrated development environment (IDE).

23. A method according to claim 21, wherein analyzing the GUI comprises analyzing the GUI according to at least one user-settable property, the user-settable property being settable to a value by the GUI designer at design time of the GUI.

24. A method according to claim 21, wherein generating the voice command set comprises generating the voice command set according to at least one user-settable property, the user-settable property being settable to a value by the GUI designer at design time of the GUI.

25. A method according to claim 21, wherein making the generated voice command set available to the speech-recognition engine comprises making the generated voice command set available to the speech-recognition engine according to at least one user-settable property, the user-settable property being settable to a value by the GUI designer at design time of the GUI.

26. A method according to claim 21, further comprising, at run time of the GUI, in response to a change in the GUI, revising the generated voice command set according to the changes in the GUI.

27. A method according to claim 21, further comprising, at run time of the GUI, in response to a change in the GUI, revising the generated voice command set according to the changes in the GUI according to at least one user-settable property, the user-settable property being settable to a value by the GUI designer at design time of the GUI.

28. A method according to claim 21, further comprising, at run time of the GUI, in response to a change in the GUI, generating a revised voice command set according to the changes in the GUI.

29. A method according to claim 21, further comprising, at run time of the GUI, in response to a change in the GUI, generating a revised voice command set according to the changes in the GUI according to at least one user-settable property, the user-settable property being settable to a value by the GUI designer at design time of the GUI.

30. A data processing system comprising:
   a display; and
   a processor adapted with computer-readable instructions to:
      include a voice user interface controller (VUIcontroller) in a graphical user interface (GUI) at design time of the GUI that will be executed at run time of the GUI;
      receive, at design time of the GUI, first input from a GUI designer that specifies a voice-enabling property of a first selected control of the GUI being designed;
      receive, at design time of the GUI, second input from the GUI designer that disables voice control of a second selected control of the GUI being designed;
      automatically execute the VUIcontroller at run time of the GUI;
      automatically analyze, by the VUIcontroller at run time, the GUI from within a process that executes the GUI;
      generate a voice-enabled GUI based on the analysis;
      generate, from the analysis of the GUI, a voice command set corresponding to voice-enabled controls of the GUI; and
      make the generated voice command set available to a speech recognition engine.

* * * * *